United States Patent [19]
Kearns

[11] Patent Number: 5,868,974
[45] Date of Patent: Feb. 9, 1999

[54] PROCESS FOR PREPARING PITCH FOAMS

[75] Inventor: Kristen M. Kearns, Yellow Springs, Ohio

[73] Assignee: The United States of America as represented by the Secretary of the Air Force, Washington, D.C.

[21] Appl. No.: 979,710

[22] Filed: Nov. 27, 1997

[51] Int. Cl.$^6$ .............................. C01B 31/00; B29C 44/02
[52] U.S. Cl. .......................... 264/29.6; 264/29.1; 264/42; 264/50
[58] Field of Search .............................. 264/42, 50, 29.1, 264/29.6, 29.7

[56] References Cited

U.S. PATENT DOCUMENTS

| | | | |
|---|---|---|---|
| 3,389,964 | 6/1968 | Olstowski | 264/42 |
| 4,022,875 | 3/1977 | Vinton et al. | 264/29.1 |
| 4,024,226 | 5/1977 | Lersmacher et al. | 264/29.1 |
| 4,025,689 | 5/1977 | Kobayashi et al. | 264/29.1 |
| 4,146,401 | 3/1979 | Yamada et al. | 264/42 |
| 4,276,246 | 6/1981 | Bonzom et al. | 264/53 |
| 4,832,881 | 5/1989 | Arnold et al. | 264/29.7 |
| 4,891,126 | 1/1990 | Mochida et al. | 209/39 |
| 4,992,254 | 2/1991 | Kong | 264/29.1 |
| 5,194,198 | 3/1993 | von Bonin et al. | 264/42 |
| 5,208,003 | 5/1993 | Simandl et al. | 264/29.1 |
| 5,421,524 | 6/1995 | Haddow | 241/5 |
| 5,686,031 | 11/1997 | Coronado et al. | 264/42 |
| 5,770,127 | 6/1998 | Abrams et al. | 264/29.1 |

OTHER PUBLICATIONS

U.S. Patent application Serial No. 08/692,902, filed Jul. 15, 1996, by Frances L. Abrams et al, for Carbon or Graphite Foam Reinforced Composites. (Reviewed issued patent).

*Primary Examiner*—Allan R. Kuhns
*Attorney, Agent, or Firm*—Charles E. Bricker; Thomas L. Kundert

[57] ABSTRACT

An improved process for the preparation of a pitch foam with a microcellular structure and a uniform pore size comprises the steps of (a) pressing a quantity of a pitch to provide a pressed article, (b) placing the pressed article in a pressure vessel, (c) introducing an inert gas into the pressure vessel under an elevated pressure of about 200 to 500 psi, (d) heating the pressed article within the pressure vessel to about 10° to 40° C. above the melting temperature of the pitch, (e) introducing additional inert gas, under pressure, to obtain a final pressure within the pressure vessel of about 1000 to 1500 psi, (f) holding the pressure vessel and the compressed article under pressure for about 10 to 40 minutes, (g) venting the pressure vessel to atmospheric pressure, thereby providing a porous foam, (h) stabilizing the porous foam at an elevated temperature in an oxygen-containing environment, and (i) cooling the resulting, stabilized porous foam to ambient temperature at a cooling rate of about 0.1° to 5° C. per minute. The porous pitch foam can be converted to a porous carbon foam by heating the pitch foam in an inert atmosphere to a temperature sufficient to carbonize the pitch. The porous carbon foam can be converted to a porous graphitic foam by heating the carbon foam in an inert atmosphere to a temperature sufficient to graphitize the pitch.

6 Claims, No Drawings

PROCESS FOR PREPARING PITCH FOAMS

PROCESS FOR PREPARING PITCH FOAMS AND PRODUCTS SO PRODUCED RIGHTS OF THE GOVERNMENT

The invention described herein may be manufactured and used by or for the Government of the United States for all governmental purposes without the payment of any royalty.

BACKGROUND OF THE INVENTION

The present invention is directed to a process for the manufacture of pitch foams and to products resulting from this process. The invention includes the subsequent conversion of the pitch foams to carbon and graphite foams and to the products resulting therefrom.

It is known in the prior art that pitch foams can be prepared that have a variety of uses, such as, for example, as coatings, soil aerators, humidity regulators, and insulators in the building industry. Pitch foams can also be used for the manufacture of carbon or graphite foams. Bonzom et al, U.S. Pat. No. 4,276,246, issued Jun. 30, 1981, disclose the preparation of pitch foams in which pitch derived from a steam cracking residue, asphalt, or coal tar, or mixtures thereof, is expanded at elevated temperature in a mold by means of a porogenic agent.

Carbon and graphite foams have also been obtained by the carbonization of foams of plastic materials (thermoplastic or thermosetting), e.g., phenolic resins, or polyurethanes. Arnold et al, U.S. Pat. No. 4,832,881, issued May 23, 1989, disclose the preparation of a low density, open-celled microcellular carbon foam by the phase inversion of a polyacrylonitrile solution, followed by carbonization and, optionally, graphitization, of the foam.

I have discovered an improved process for the preparation of a pitch foam with a microcellular structure and a uniform pore size.

Accordingly, it is an object of the present invention to provide an improved process for the preparation of a pitch foam with a microcellular structure and a uniform pore size.

Other objects and advantages of the present invention will be apparent to those skilled in the art.

SUMMARY OF THE INVENTION

In accordance with the present invention there is provided an improved process for the preparation of a pitch foam with a microcellular structure and a uniform pore size which comprises the steps of (a) pressing a quantity of a pitch to provide a pressed article, (b) placing the pressed article in a pressure vessel, (c) introducing an inert gas into the pressure vessel under an elevated pressure of about 200 to 500 psi, (d) heating the pressed article within the pressure vessel to about 10° to 40° C. above the melting temperature of the pitch, (e) introducing additional inert gas, under pressure, to obtain a final pressure within the pressure vessel of about 1000 to 1500 psi, (f) holding the pressure vessel and the compressed article under pressure for about 10 to 40 minutes, (g) venting the pressure vessel to atmospheric pressure, thereby providing a porous foam, (h) stabilizing the porous foam at an elevated temperature in an oxygen-containing environment, and (i) cooling the resulting, stabilized porous foam to ambient temperature at a cooling rate of about 0.1° to 5° C. per minute.

The porous pitch foam can be converted to a porous carbon foam by heating the pitch foam in an inert atmosphere to a temperature sufficient to carbonize the pitch. The porous carbon foam can be converted to a porous graphitic foam by heating the carbon foam in an inert atmosphere to a temperature sufficient to graphitize the pitch.

DETAILED DESCRIPTION OF THE INVENTION

The first step of the process of the present invention comprises pressing a quantity of a pitch to provide a pressed article. To obtain the maximum advantage of the present invention, i.e., to obtain a microcellular foam, it is preferred that the particle size of the pitch be relatively small. In general, an average particle size of about 0.5 to 10 microns, preferably about 1 to 3 microns, is acceptable.

The pitch can be reduced in size using a jet mill. The pulverizing mechanism of the jet mill is divided into two types, a collision-type and a gas current type. In both types, powder is moved at high speed by pulverizing gas at high pressure. In the collision-type, the powder collides with a target, thus pulverizing the alloy. The powder particles mutually collide with each other and are pulverized in the gas current type.

The pitch powder particles are pressed into a mold under a pressure sufficient to produce a pressed article. The pressure required for molding can range from 100 to 2,000 psi, or greater. In order to produce a foam article, it is necessary that the pressure be less than that required to completely eliminate all voids, yet sufficiently high to enable the pitch particles to adhere or temporarily bond to each other.

The pressed article is next placed in a pressure vessel and an inert gas, such as nitrogen, helium or argon, is introduced under pressure of about 200 to 500 psi, so that the gas fills the voids between the pitch particles. It may be desirable to pressurize and vent the vessel several times to ensure that all the voids are filled with the inert gas. The article is heated to about 10° to 40° C. above the melting temperature of the pitch and additional inert gas, under pressure, is introduced to obtain a final pressure within the pressure vessel of about 1,000 to 1,500 psi. The article is held under pressure at temperature for about 10 to 40 minutes, then the pressure is rapidly vented to atmospheric pressure. As the pitch particles are heated above their melting temperature, the pitch flows to seal the inert gas in the voids or interstices between particles. When the pressure is rapidly decreased, the gas expands to form bubbles, and further expands to break these bubbles thus forming an open cell structure.

The resulting porous foam is stabilized at an elevated temperature in an oxygen-containing environment. Stabilization of the porous foam is intended to render the surface layer infusible so that the porous structure of the foam is maintained in any subsequent treatments or use. The maximum temperature at which the stabilization is carried out should not markedly exceed the temperature at which the pitch foam softens. In general, stabilization can be carried out by subjecting the porous foam to an oxygen or air atmosphere for about 8 to 24 hours at temperatures of about 150° to 260° C., preferably about 150° to 220° C., or until a weight gain of about 5 to 10 percent is achieved. The resulting, stabilized porous foam is cooled to ambient temperature at a cooling rate of about 0.1° to 5° C. per minute, so as to prevent thermal stresses in the foam.

The stabilized porous foam can be carbonized by gradually heating the foam under an inert atmosphere to a temperature of about 800° to 900° C. Inert gases such as nitrogen, helium or argon may be used, preferably in the form of a stream of gas. It is important to accurately control the rise in temperature, to avoid thermal stresses which could cause cracks in the foam. Accordingly, the heating rate should be about 1° to 3° C. per minute. The resulting porous carbon foam should be held at the final temperature for at least 1 hour.

Carbon foams may be heated further to a high temperature of about 2,400° to 3,000° C., under an inert atmosphere, to graphitize the foam. During this further heating, the remaining small quantity of hydrogen in the foam is substantially completely eliminated. The inert gas used during this treatment can be of the same type as that used for the carbonization process. The process is generally carried out for about 1 to 10 minutes at final temperature.

The process of the present invention may be used with any pitch, including pitches derived from steam cracking residues, thermal or catalytic cracking residues, asphalt pitches, pitches from distillation residues of petroleum residues, coal tar pitches, extract pitches and mixtures thereof, as well as synthetic pitches, such as those produced by polymerizing a condensed polycyclic aromatic hydrocarbon. The pitches used are desirably pitches possessing high softening points and containing little volatile product. They are preferably, pitches having a Kraemer-Sarnow (KS) softening point between 90° and 250° C.

Preferred pitches are the synthetic pitches, such as those prepared by the process described in Mochida et al, U.S. Pat. No. 4,891,126, issued Jan. 2, 1990. This patent discloses a mesophase pitch obtained from polymerizing a condensed polycyclic aromatic hydrocarbon, such as naphthalene, in the presence of a hydrogen fluoride/boron trifluoride catalyst, which pitch contains at least about 90% of an optically anisotropic phase. An exemplary pitch is AR Resin® manufactured by Mitsubishi Gas Chemical Co., Tokyo, Japan. This pitch is produced by the catalytic polymerization of naphthalene and is supplied in pellet form. The pitch has a softening temperature of 239° C., is 100% anisotropic, and has a glass transition temperature range of 230° to 260° C.

The following examples illustrate the invention:

EXAMPLE I

AR pitch was jet milled into particles having an average size of 1.5 microns. A quantity of the jet-milled pitch was weighed and pressed into a puck at room temperature and about 1,000 psi molding pressure. The pressed puck was placed in a pressure vessel and the vessel was pressurized to 500 psi with nitrogen. The puck was then heated at 3° C. per minute to 270° C. Additional nitrogen was introduced into the vessel to achieve a final pressure of 1,000 psi. The puck was held at 270° C. and 1,000 psi for 15 minutes.

The pressure vessel was rapidly vented. After venting, and while the foam temperature was at least 240° C., the foam was removed from the pressure vessel and placed in a forced air oven. The foam was stabilized at 150° to 220° C. until a weight gain of 6 to 10 percent was achieved. Following stabilization, the foam was cooled slowly, i.e., at about 1° C. per minute, to ambient temperature.

The stabilized foam was carbonized at 900° C., under nitrogen. The carbonized foam had a cell count of 200 pores per inch (ppi), a compression strength of about 300 psi, a compression stiffness of about 12,500 pounds per sq. inch, a compression modulus of about 30,000 psi and a density of about 0.006 lb/in$^3$.

EXAMPLE II

A 500 ppi foam was prepared under the same conditions as in Example I with these exceptions: final temperature prior to venting was 250° C. and the hold time at 250° C. and 1,000 psi was 30 minutes. The foam was stabilized and then carbonized, as above.

The stabilized foam had a compression strength of about 9,500 psi and a density of about 0.03 lb/in$^3$. The carbonized foam had a compression stiffness of about 112,500 pounds per sq. inch, a compression modulus of about 580,000 psi.

Carbon and graphite foams produced according to the process of the present invention can be used for many structural and non-structural applications, including core material to replace aluminum in honeycomb panels, composite mandrels or tooling, sound insulation around engine casings, support structure for satellite antennas, core material for safety fuel cells, core material for liquid fuel tanks, core for heat exchangers and the like.

Various modifications may be made in the instant invention without departing from the spirit and scope of the appended claims.

I claim:

1. A process for the preparation of a pitch foam with a microcellular structure and a uniform pore size which comprises the steps of (a) pressing a quantity of a pitch to provide a pressed article, (b) placing the pressed article in a pressure vessel, (c) introducing an inert gas into the pressure vessel under an elevated pressure of about 200 to 500 psi, (d) then heating the pressed article within the pressure vessel to about 10° to 40° C. above the melting temperature of the pitch, (e) introducing additional inert gas, under pressure, to obtain a final pressure within the pressure vessel of about 1000 to 1500 psi, (f) holding the pressure vessel and the compressed article under pressure for about 10 to 40 minutes, (g) venting the pressure vessel to atmospheric pressure, thereby providing a porous foam, (h) stabilizing the porous foam at an elevated temperature in an oxygen-containing environment, and (i) cooling the resulting, stabilized porous foam to ambient temperature at a cooling rate of about 0.1° to 5° C. per minute.

2. The process of claim 1 further comprising the step of carbonizing the product of step (i) by heating said product under an inert atmosphere to a temperature of about 800° to 900° C. for about 1 hour.

3. The process of claim 2 further comprising the step of graphitizing the carbonized product by heating said product under an inert atmosphere to a temperature of about 2,400° to 3,000° C. for about 1 to 10 minutes.

4. The process of claim 1 wherein said pitch has an average particle size of 0.5 to 10 microns.

5. The process of claim 4 wherein said pitch has an average particle size of 1 to 3 microns.

6. The process of claim 1 wherein said pitch is a mesophase pitch.

* * * * *